United States Patent
Shaw et al.

(10) Patent No.: US 9,585,144 B1
(45) Date of Patent: Feb. 28, 2017

(54) BEACON SYNCHRONIZATION BETWEEN A CLIENT AND A WIFI GROUP OWNER

(71) Applicant: Amazon Technologies, Inc., Reno, NV (US)

(72) Inventors: King Shaw, Saratoga, CA (US); Robert Brown, Pleasant Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 14/273,029

(22) Filed: May 8, 2014

Related U.S. Application Data

(60) Provisional application No. 61/821,169, filed on May 8, 2013.

(51) Int. Cl.
*H04J 3/00* (2006.01)
*H04W 72/04* (2009.01)
*H04W 76/02* (2009.01)

(52) U.S. Cl.
CPC ....... *H04W 72/0446* (2013.01); *H04W 76/02* (2013.01)

(58) Field of Classification Search
None
See application file for complete search history.

(56) References Cited

U.S. PATENT DOCUMENTS

| | | | | |
|---|---|---|---|---|
| 8,817,682 B1* | 8/2014 | Goel | | H04W 52/0206 370/311 |
| 2007/0140191 A1* | 6/2007 | Kojima | | H04W 8/005 370/338 |
| 2008/0056133 A1* | 3/2008 | Deshpande | | H04W 52/0216 370/235 |
| 2009/0017844 A1* | 1/2009 | Li | | H04W 68/00 455/458 |
| 2009/0092075 A1* | 4/2009 | Corson | | H04W 40/244 370/328 |
| 2011/0038311 A1* | 2/2011 | Marin | | H04W 68/00 370/328 |
| 2013/0044739 A1* | 2/2013 | Huang | | H04W 52/0216 370/338 |
| 2013/0279438 A1* | 10/2013 | Kwon | | H04W 72/0406 370/329 |
| 2014/0044106 A1* | 2/2014 | Bhagwat | | H04W 72/1215 370/336 |
| 2014/0119277 A1* | 5/2014 | Athankutty | | H04W 88/06 370/328 |
| 2014/0133469 A1* | 5/2014 | Lee | | H04W 52/0216 370/336 |
| 2014/0201280 A1* | 7/2014 | Qi | | H04W 4/005 709/204 |
| 2014/0269668 A1* | 9/2014 | Zhu | | H04J 3/07 370/350 |

\* cited by examiner

*Primary Examiner* — Kibrom T Hailu
(74) *Attorney, Agent, or Firm* — Seyfarth Shaw LLP; Ilan Barzilay

(57) ABSTRACT

Various approaches enable a computing device (e.g., mobile phone, tablet computer, etc.), serving as a client to inform a group owner (GO) of a peer-to-peer (P2P) group in a Wi-Fi Direct network or other such network regarding the timing of the group owner's beacon schedule. Advantageously, this synchronization of the beacon schedule between the client and the GO can enable improved throughput and latency of the client device when the client device is in concurrent mode (i.e., when the P2P client is connected to two networks such as a legacy Wi-Fi network with an AP and a P2P network with a GO).

18 Claims, 10 Drawing Sheets

BEACON SYNCHRONIZATION BETWEEN A CLIENT AND A WIFI GROUP OWNER

CROSS-REFERENCE TO RELATED APPLICATIONS

This application claims priority to U.S. Provisional Patent Application Ser. No. 61/821,169, entitled "BEACON SYNCHRONIZATION BETWEEN A CLIENT AND A WIFI GROUP OWNER," filed May 8, 2013, which is hereby incorporated herein by reference, in its entirety and for all purposes.

BACKGROUND

People are increasingly interacting with computers and other electronic devices in new and interesting ways. For example, as an increasing variety and amount of content is being made available over networks such as the Internet, users are obtaining an increasing amount of their content over those networks. Users can access this content using any appropriate electronic device, including devices that utilize wireless networks such as those specified by IEEE 802.11 or "Wi-FI" wireless networking standards. In traditional wireless networks, clients discover and associate to wireless local area networks (WLANs), which are created and announced by Access Points (APs). In this way, a device usually behaves either as an AP or as a client, each of these roles involving a different set of functionality. One recently proposed standard of "Wi-Fi Direct" aims to enhance the device-to-device interaction for Wi-Fi networks. Under Wi-Fi Direct, the roles for devices are specified as dynamic, and hence a Wi-Fi Direct device may implement both the role of a client and the role of a group owner (GO). These roles are therefore logical roles that could even be executed simultaneously by the same device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for managing network connectivity for electronic devices. In particular, various approaches discussed herein enable a computing device (e.g., mobile phone, tablet computer, etc.), serving as a client to inform a group owner (GO) of a peer-to-peer (P2P) group in a Wi-Fi Direct network or other such network regarding the timing of the group owner's beacon schedule. Advantageously, this synchronization of the beacon schedule between the client and the GO can enable improved throughput and latency of the client device when the client device is in concurrent mode (i.e., when the P2P client is connected to two networks such as a legacy Wi-Fi network with an AP and a P2P network with a GO). In particular, various embodiments described herein may enable higher throughput in both networks, reduced video streaming latency, lower packet loss rate, lower the probability of beacon-miss-induced disconnection, more predictable performance, and flexibility to adjust the ratio of time that the client device spends on two networks to accommodate the media data rate requirements. In some embodiments, the synchronization techniques described herein may be particularly useful for applications that utilize large amounts of packet communication between the GO and the client device, such as video streaming applications.

Figure 1:
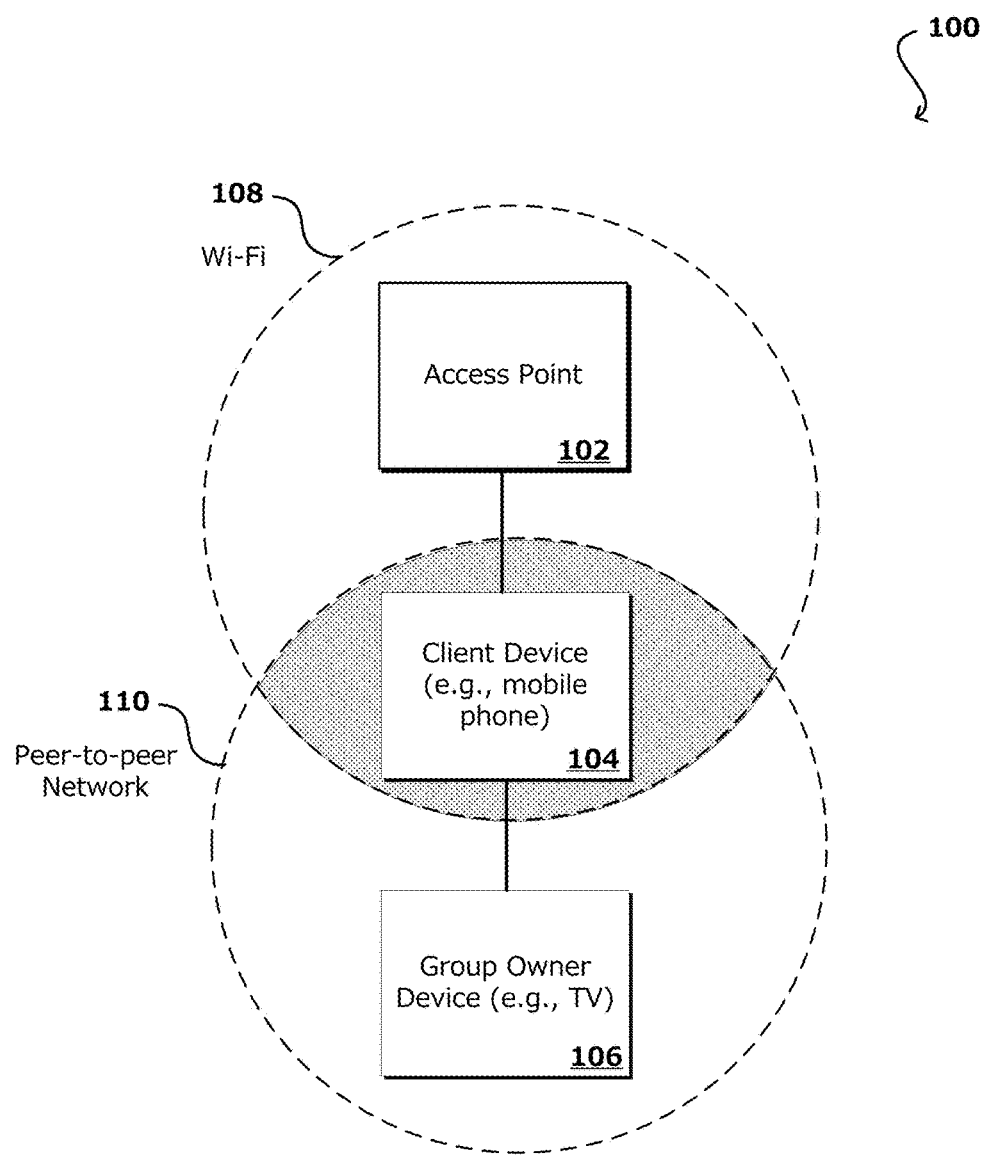
FIG. 1 illustrates an example of a network setup, in accordance with various embodiments.

FIG. 1 illustrates an example of a network setup 100, in accordance with various embodiments. As shown in the illustration, a client device 104 may be operating in concurrent mode where the client device is connected to both (1) an access point (AP) 102 of a wireless local area network (WLAN) 108 and (2) a group owner (GO) 106 of a device-to-device network (e.g., Wi-Fi Direct network or other such network) 110. In accordance with various embodiments, the client device 104 can be a portable computing device, such as a smart phone, tablet computer, or personal data assistant or any appropriate computing or electronic device, as may include personal computers, routers, set top boxes, smart televisions, video game systems, wearable computers (e.g., smart watches, smart glasses, etc.) and the like. Similarly, the GO device may be any computing device, such as mentioned above. Other GO devices include, for example, a television, an audio speaker, a network storage device, a media sink, a portable computing device, a mobile hot spot, or any of the computing devices listed above. The AP can be, for example, a wireless router that is configured to maintain a wireless network under the 802.11 wireless networking standards or other such network; however, in most wireless networking implementations, the AP device is a wireless router or other gateway device.

In accordance with various embodiments, IEEE 802.11 or "Wi-Fi" is a set of media access control (MAC) and physical layer (PHY) specifications for implementing wireless local area network (WLAN) computer communication in the 2.4, 3.6, 5 and 60 GHz frequency bands. Devices, such as access points and other electronic devices that have conformed to the technical specifications IEEE 802.11 can communicate (e.g., transfer and receive data) over these frequency bands such as by exchanging data. For example, the client device can use connect to a network resource such as the Internet via a wireless network access point, where the client device connects to the access point using Wi-Fi (i.e., IEEE 802.11 wireless networking standards).

In accordance with various embodiments, under Wi-Fi direct or other peer-to-peer networks, instead of leveraging the ad-hoc mode of operation of the IEEE 802.11 "Wi-Fi" operating standards, Wi-Fi Direct builds upon the IEEE 802.11 "Wi-Fi" infrastructure mode and lets devices negotiate who will take over the AP-like functionalities. For example, in a typical Wi-Fi network, clients discover and associate to WLANs, which are created and announced by Access Points (APs). A device unambiguously behaves either as an AP or as a client, each of these roles involving a different set of functionality. A major novelty of Wi-Fi Direct is that these roles are specified as dynamic, and hence a Wi-Fi Direct device has to implement both the role of a client and the role of an AP (sometimes referred to as Soft-AP). These roles are therefore logical roles that could even be executed simultaneously by the same device, for instance by using different frequencies or time-sharing the channel through virtualization techniques.

In accordance with various embodiments, Wi-Fi Direct devices, can communicate by establishing peer-to-peer Groups. The device implementing access point-like functionality in the peer-to-peer group is referred to as the peer-to-peer group owner (GO), and devices acting as clients are known as clients. The GO manages the network as does an AP in a traditional network. This can include, for example, determining parameters of the network such as operating channel, network name, network security, sending beacons with the negotiated SSID, etc. Given that these roles are not static, when two peer-to-peer devices discover each other they negotiate their roles (client and GO) to establish a peer-to-peer group. Once the peer-to-peer group is established, other clients can join the group as in a traditional Wi-Fi network. In accordance with various embodiments, the Wi-Fi Direct standard defines how Wi-Fi Direct devices negotiate to appoint a GO, called group formation. The other key mechanisms in the standard include device discovery, service discovery, invitation, and client discovery. It's mandatory that Wi-Fi Direct devices support the group formation capability and the device and client discovery mechanisms. Device discovery allows devices to discover one another and exchange device information. Client discovery allows a device to discover which devices are members of a group.

In various embodiments, both the AP device and the GO device beacon, i.e., these devices periodically transmit beacon frames to announce the presence of a Wireless LAN to any recipient device receiving the beacon frame. The beacon contains the information about the corresponding network. For example, when the AP device beacons, the beacon contains information corresponding to the network created and announced by the AP device. Similarly, when the GO device beacons, the beacon contains information corresponding to the network owned and announced by the GO device. In regard to the AP device, the beacon can include, for example, a MAC header, a frame body, and a frame check sequence (FCS). Other information can include, a timestamp, a beacon interval, capability information, service set identification (SSID), supported rates, independent basic service set (IBSS), etc.

In accordance with various embodiments, the time stamp can be used by the client device, GO device, or other device to change their respective local clock to the time stamp which can be used to assist with synchronization. In accordance with an embodiment, the beacon interval is the time interval between beacon transmissions. The time at which a node (e.g., an AP or station when in ad hoc) must send a beacon is known as Target Beacon Transmission Time (TBTT). The beacon interval can be expressed in Time Unit (TU) and is a configurable parameter in the AP and/or GO and is typically configured as 100 TU. The capability information field spans up to 16 bits and can contain information about capability of the device/network. In various embodiments, the network can include an AdHoc or Infrastructure network and can be signaled in this field. In accordance with various embodiments, the SSID can be a 1 to 32 byte string. This is normally a human-readable string and thus commonly called the "network name". In an independent basic service set identification (IBSS), the SSID is chosen by the client device that starts the network, and broadcasting of the SSID is performed in a pseudo-random order by all devices that are members of the network.

In accordance with an embodiment, for an IBSS, the basic service set identification (BSSID) is a locally administered MAC address generated from a 46-bit random number. The individual/group bit of the address is set to 0 (individual). The universal/local bit of the address is set to 1 (local). The BSSID is the MAC address of the wireless access point (WAP) generated by combining the 24 bit Organization Unique Identifier (the manufacturer's identity) and the manufacturer's assigned 24-bit identifier for the radio chipset in the WAP. The BSSID is the formal name of the BSS and is associated with only one BSS. The SSID is the informal (human) name of the BSS. A BSS is functionally a contention domain as a local or workgroup network is functionally a broadcast domain.

Figure 2:
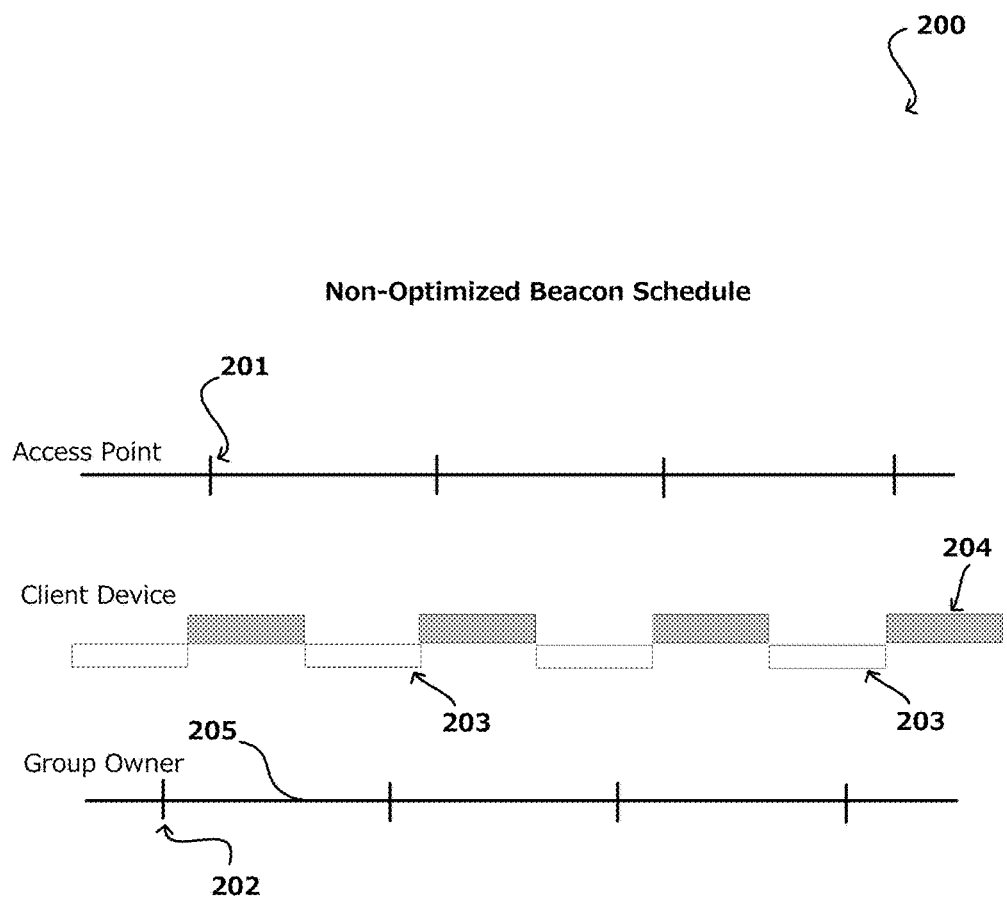
FIG. 2 illustrates an example of the time intervals during which the client device is on the AP network and the intervals during which the client device is on the GO network in accordance with an embodiment.
Figure 3:
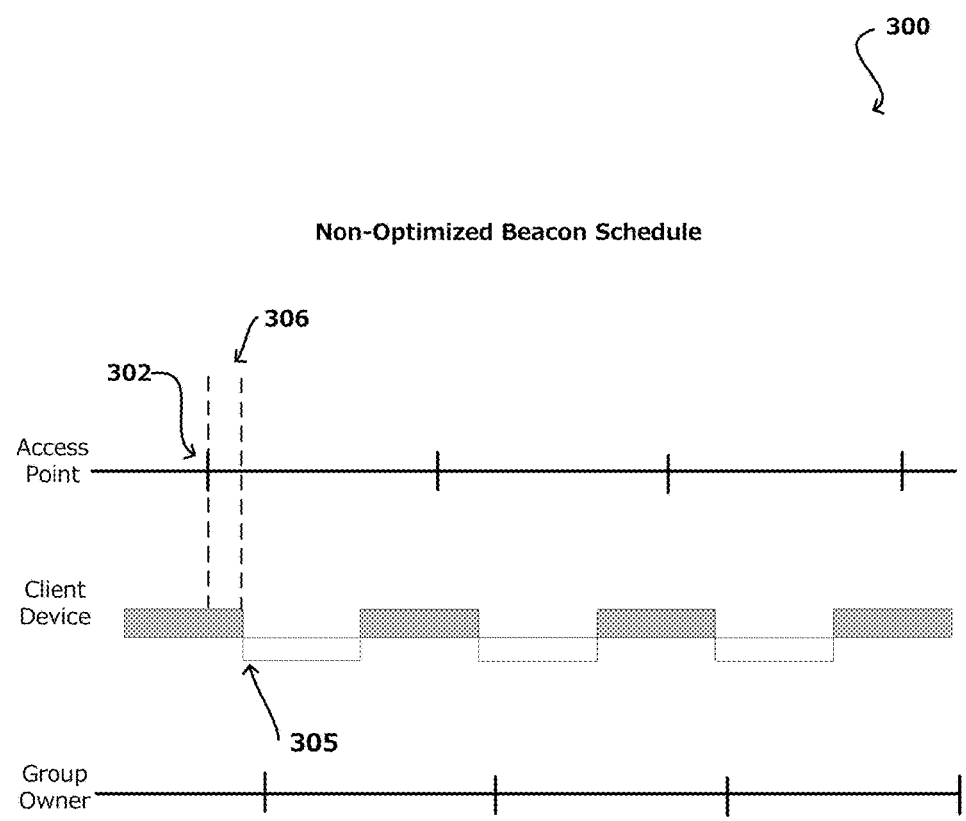
FIG. 3 illustrates an example where the client device switches from the AP network to the GO network shortly after AP's beacon in accordance with an embodiment.
Figure 4:
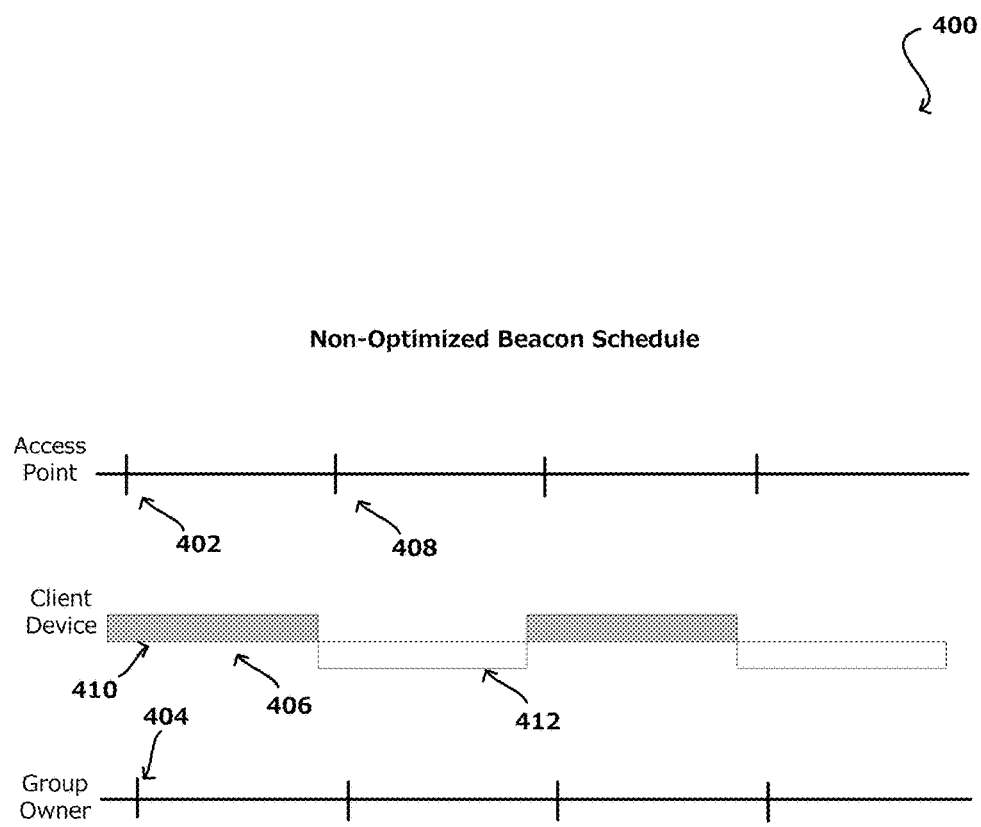
FIG. 4 illustrates an example where the beacons of the AP are close in time with respect to the beacons of the GO, thereby potentially causing poor performance for the client device in accordance with an embodiment.

In accordance with various embodiments, each of these devices may beacon at a different rate, also referred to herein as a beacon interval. For example, the AP may transmit beacon frames upon every 100 time units where each time unit is equivalent to 1024 microseconds. In accordance with various embodiments, a difference between beacon intervals can impact communication performance (e.g., video streaming) between the GO and the client device, as may include reduced throughput in both networks, increased video streaming latency, higher packed loss rate, etc. This is because a client device in concurrent mode may not be on both networks (i.e., both the legacy Wi-Fi and the Wi-Fi Direct network) simultaneously. Rather, the client device may periodically switch (e.g., alternate) between the two networks such that at any given moment in time, the client is either on the AP network (e.g., legacy Wi-Fi network) or on the GO network (e.g., Wi-Fi Direct network) and may, for a number of reasons, not be able to receive and/or transfer data to one of the AP or the GO. FIGS. 2, 3, and 4 are example situations where the difference between beacon intervals can impact communication performance between the GO and the client device.

FIG. 2 illustrates an example 200 of the time intervals during which the client device is on the AP network and the intervals during which the client device is on the GO network. For example, as shown in the illustration, during time interval 204, the client device is operating on the AP network and during time interval 203, the client device is operating on the GO network.

Additionally, the example shown in FIG. 2 illustrates the beacon intervals of both the GO and the AP. For example, at time 201, the AP beacons (i.e., transmits a beacon frame to the client device, as well as any other client devices listening to it). Similarly, at time 202, the GO beacons. As evident from the illustration, conventionally, the beacon interval of the AP is not synchronized with the beacon interval of the GO and as such, the two devices beacon completely independently of each other and without regard to the other device's beacons. This may not be the optimal situation for the client device that is alternating its time between the two networks. One reason for this is that during certain time periods, the GO may be in power save mode where no packets may be transmitted or received between the client device and the GO. Under the Wi-Fi Direct standard, the GO is required to stay active for at least a period of time after it beacons, after which, the GO may go into power save mode. For example, the GO may tend to go into power save mode towards the end of its beacon interval as shown by marking 205. Assuming no synchronization, if the client device happens to switch to the GO network at the time when the GO is in power save mode (as shown in the illustration), then the time spent by the client on the GO network will not be efficiently utilized and may be essentially wasted because no packets may be transmitted between the client and the GO during that time interval (due to the GO operating in power save mode).

FIG. 3 illustrates an example 300 where the client device switches from the AP network to the GO network shortly after AP's beacon. Even if the AP is not allowed to go into power save mode (as in the example previously described), there may be other inefficiencies when the GO beacons without regard to the client or the AP. In conventional legacy Wi-Fi networks, the AP can buffer packet traffic (e.g., unicast, broadcast, etc.) that are intended for the client device (or any other client devices connected to the AP). This usually occurs after the beacon, for example, beacon 302 of the AP. Therefore, if the client device switches from the AP network to the GO network too quickly after the AP beacon (as shown in this illustration at 305), then the client device is risking the possibility of not having received all of its packets that were buffered by the AP. This is because the time 306 that the client device is on the AP network is less than a threshold amount of time to communicate the packets of information. This may cause poor performance due to lost packets or re-transmitted packets.

FIG. 4 illustrates an example 400 where the beacons of the AP are close in time with respect to the beacons of the GO, thereby potentially causing poor performance for the client device. As shown in the illustration, the beacons of the GO occur very shortly after the beacon of the AP. As a result of this, it is not possible for the client to switch between the network of AP and GO in the short time frame between the AP's beacon (e.g., beacon 402) and the GO's beacon (e.g., beacon 404). Consequently, the client device ends up remaining on each network for a much longer time interval than in the examples shown in FIGS. 2-3. As a result of the longer duration on each network, latency (e.g., 406) for the client device communications will increase substantially because it will take longer for the client to receive packets on the other network. For example, while the client device remains on the AP network for a longer period of time, it is not able to receive packets from the GO network. Similarly, while the client device remains on the GO network for a long period of time, it is not able to receive packets from the AP network. In addition, FIG. 4 illustrates that the client device may miss some of the beacons from each network. For example, when the client device is connected to the APs network 410 the client device misses beacon 404 from the GO and when the device is connected to the GOs network 412 the client device misses beacon 408 from the AP, where beacon 404 and 408 may contain important information for the client device.

In various embodiments, an optimization to the schedules illustrated above is for the client device to wake up at the right times to cover all of the beacons in both networks. In addition to addressing the problems illustrated above in FIGS. 2, 3, and 4 the beacon frames also contain some useful or necessary information that is needed by the client and as such, it is desirable for the client device to receive the beacon frames from both the AP and the GO. Accordingly, in accordance with various embodiments, a computing device (e.g., mobile phone, tablet computer, etc.), serving as a client to inform a group owner (GO) of a peer-to-peer (P2P) group in a Wi-Fi Direct network or other such network regarding the timing of the group owner's beacon schedule. In this way, the client device can advise the GO device of a beacon interval that may be optimized for the client.

Figure 5:
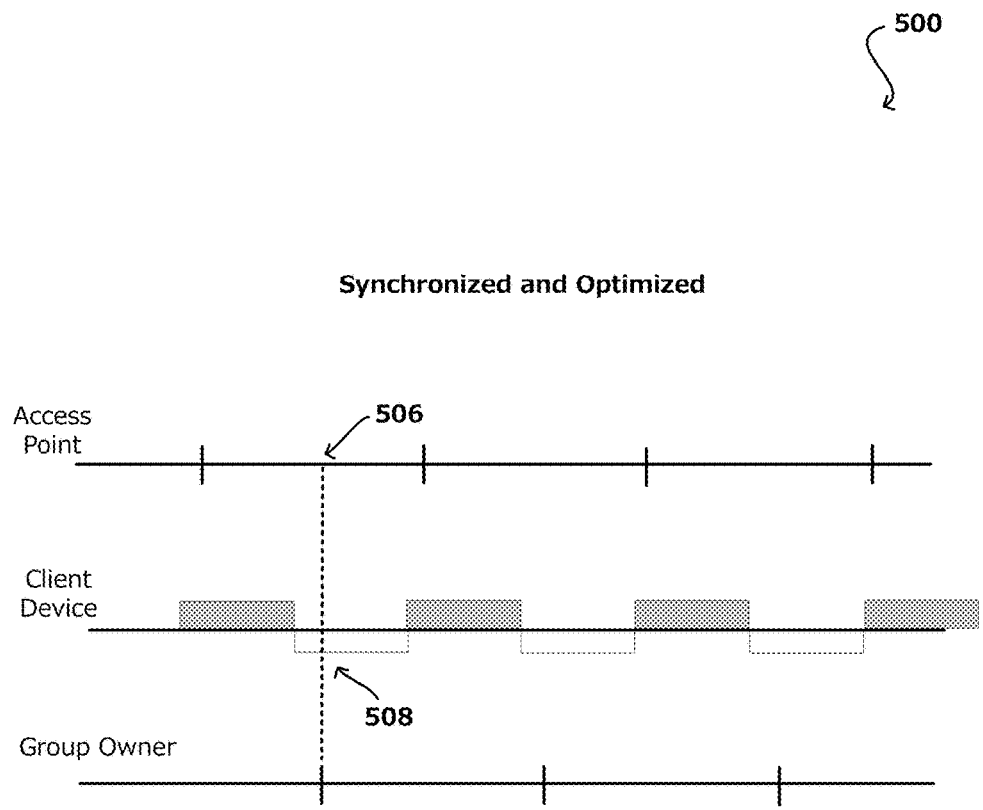
FIG. 5 illustrates an example of one potential synchronization between the client device and the GO, in accordance with various embodiments.

For example, FIG. 5 illustrates an example 500 of one potential synchronization between the client device and the GO, in accordance with various embodiments. For this figure, it is assumed that the client device wishes to remain on the AP network for 50% of its time and on the GO network for the other 50% of its time. In certain cases, that may be the best arrangement for the application of the client device because the amount of data traffic that's needed between the client and AP and the client and GO is approximately the same. It should be noted that other ratios or arrangements between the AP network and the GO network are possible. For example, the client device can be connected to the AP network 25% of its time and on the GO network for the other 75% of its time. In this example, given that the client device is evenly spilt between the two networks, the client device can advise the GO to adjust its beacon schedule such that the client device can remain on each network for an appropriate amount of time to transfer and/or retrieve the required packets. If the client device wishes to advise the GO that the client desires to spend 50% of its time on the GO network, the client device needs to provide some information to the GO.

In accordance with various embodiments, the client can provide the name of the AP that the client is connected to. This can include, for example, providing the SSID of the AP to the GO. Other information associated with the AP can be provided to the client, as may include the MAC address and operating channel number of the AP. In addition, the client device can specify to the GO the percentage or portion of time (e.g., 50%) that the client wishes to spend on the GO network. Alternatively, instead of the percentage of time, the client may specify the offset (in time) that the GO should beacon at relative to the AP's beacon.

In accordance with various embodiments, the offset can be based on a usage profile or an amount of anticipated or previously determined network traffic between the AP and the GO. The usage profile can be based on, for example, a type of application running on the client device. In this situation, the type of application can indicate an amount of bandwidth required from the AP network and the GO network for data communication. For example, a video transmission application may require more bandwidth that a gamming application and as such, the offset would be set accordingly. In accordance with various embodiments, the usage profile can change when an application terminates or a different application starts. Accordingly, based at least in part on the client devices understanding of the network load for different networks, the client device can provide an adjusted offset to the GO so that the GO can adjust its beacon schedule to accommodate the amount of bandwidth required from the AP network and the GO network.

As a result of receiving this information from the client, the GO will change its beacon schedule in such a way as illustrated in FIG. 5. As shown in FIG. 5, the GO's beacon will occur approximately half way between the AP's beacon interval, as shown at position 506. Consequently, the client device will wake up to cover all of the beacons from both the AP and the GO. In addition, the client will spend 50% of its time on each network (i.e., AP network and GO network). Also, the latency will be decreased with respect to the previous FIG. 4. Moreover, as shown in FIG. 5, the client device will wake up right before the beacon (see 508) and stay connected to the network for a substantial period of time right after the beacon, where this time interval immediately following the beacon is the most valuable time on the network because it is highly unlikely that the GO will be in power save mode during that time frame.

Figure 6:
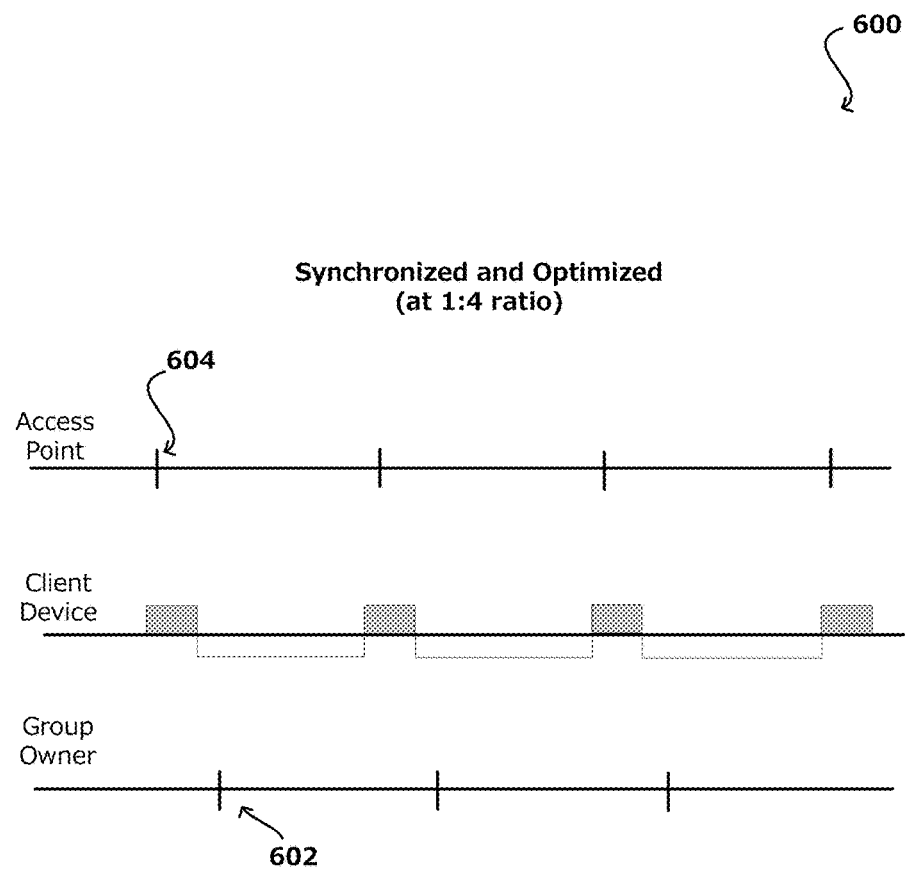
FIG. 6 illustrates another example of synchronization of GO's beacons with the client device, in accordance with various embodiments.

FIG. 6 illustrates another example 600 of synchronization of GO's beacons with the client device, in accordance with various embodiments. For this example, it is assumed that the client device wishes to spend 20% of its time on the AP network and 80% of its time on the GO network. For example, the client device may be performing video streaming with the GO, as well as performing some web browsing on the Internet via the AP. In this scenario, an optimized beacon schedule of the GO is shown in FIG. 6. In FIG. 6, the GO's beacon 602 will be closer in time to AP's beacon 604 than what was shown in FIG. 5. However, the GO's beacon will not be too close in time with respect to the AP's beacon such that the client device cannot switch between the beacons.

Figure 7:
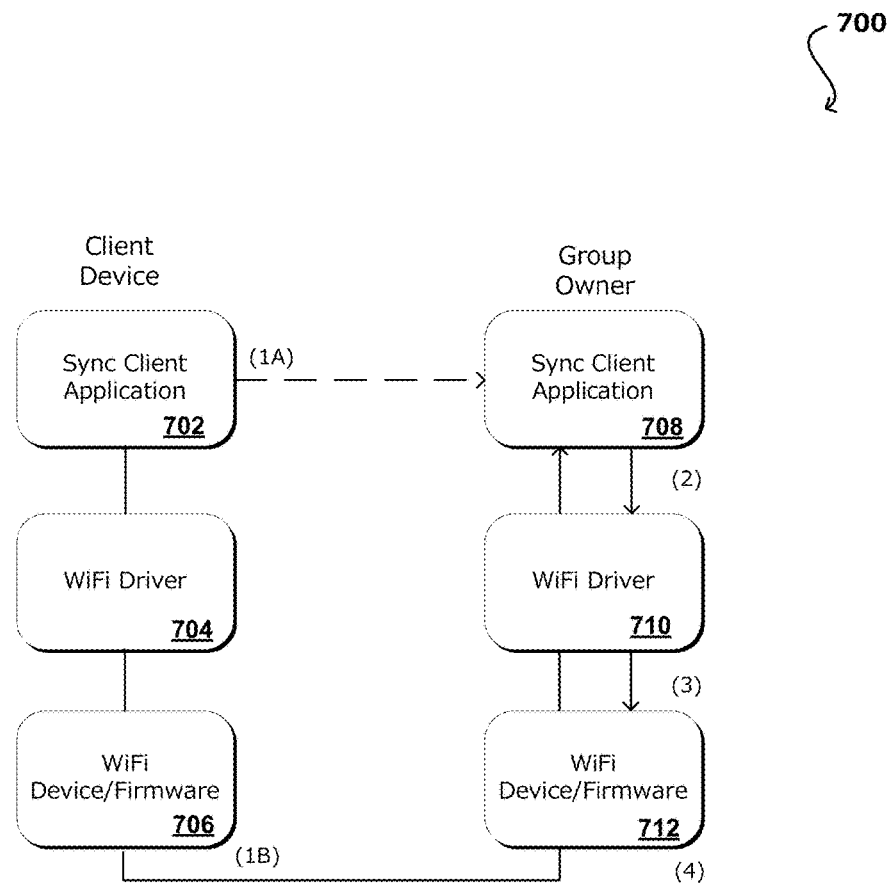
FIG. 7 illustrates an example of a software stack diagram to enable synchronization of the GO's beacon schedule between the client device and the GO, in accordance with various embodiments.

As described above, in accordance with various embodiments described herein, the client device can relay information to the GO, requesting the GO to alter its beacon schedule to synchronize with the beacon schedule of the AP. This information can be relayed from the client to the GO either before or after the Wi-Fi Direct network is formed. In one embodiment, the client device specifies to the GO the offset for the GO's beacon relative to the AP's beacons. When the GO receives the name of the AP's network or other such information including the APs MAC address, operating channel, etc. the GO performs a wireless scan to retrieve and analyze the APs beacon schedule. Thereafter, upon determining the APs beacon schedule, the GO can determine a reference of time from which to apply the offset. Based at least in part on the time reference the GO will adjust its beacon schedule FIG. 7 illustrates an example of a software stack diagram 700 to enable synchronization of the GO's beacon schedule between the client device and the GO, in accordance with various embodiments. This illustration shows the software components involved to enable the client device to request the GO to alter the GO's beacon schedule and how the software components can communicate. As shown in the example, the client device may include a Wi-Fi Direct communication device with firmware 706 and a driver 704, as well as a synchronization application (Sync Client App) 702. Similarly, the GO device may include a Wi-Fi communication device with corresponding firmware 712 and driver 710, as well as a synchronization application (Sync Server App) 708. In the illustrated embodiment, the Sync Client App 702 on the client device sends a synchronization request to the Sync Server App 708 on the GO device over the upper layer networking. In addition, the Wi-Fi communication device on the client transmits a request to the Wi-Fi communication device on the GO, requesting the GO to synchronize with a specified AP. As part of this communication, the client informs the GO of the name of the AP that the client is concurrent operating mode with. In addition, the client device can specify to the GO the time offset for a beacon schedule relative to the beacon schedule of the AP. Once the GO receives all this information, the GO makes a system call to the driver which can instruct the Wi-Fi communication device to adjust its beacon schedule to synchronize with the AP, as requested by the client. It should be noted that the exchange of communications carried by upper layer protocol (IP, for example) may be performed after the Wi-Fi Direct network is formed. Alternatively, the exchange of communications between the client and the GO can be carried by Wi-Fi Direct frames (with vendor IE's), before the Wi-Fi Direct network is formed. Different options may require difference support from the Wi-Fi device firmware/driver. These options are also not mutually exclusive.

In accordance with various embodiments, the logical order of events is indicated by steps 1B through 4. For example, as described and as shown, at a high level and as indicated by step 1A, the Sync Client App 702 on the client sends a message that includes identification information of the AP (e.g., name, operating channel) and the offset to the Sync Client App 708 on the GO. As implemented, the Sync Client application 702 on the client provides the message to the Wi-Fi Driver 704 then to the Wi-Fi Device Firmware 706. The Wi-Fi Device Firmware transmits the message over the P2P link. The message is received by the Wi-Fi Device/Firmware 712 on the GO side. As described, the message includes a synchronization request to adjust the offset of the GO's beacon schedule. The message is relayed to the Wi-Fi Driver 710, which relays the message to the Sync Client Application 708. The Sync Client Application then instructs the Wi-Fi Driver 710 to instruct the Wi-Fi Device/Firmware to adjust the beacon schedule based at least in part on the offset.

Figure 8:
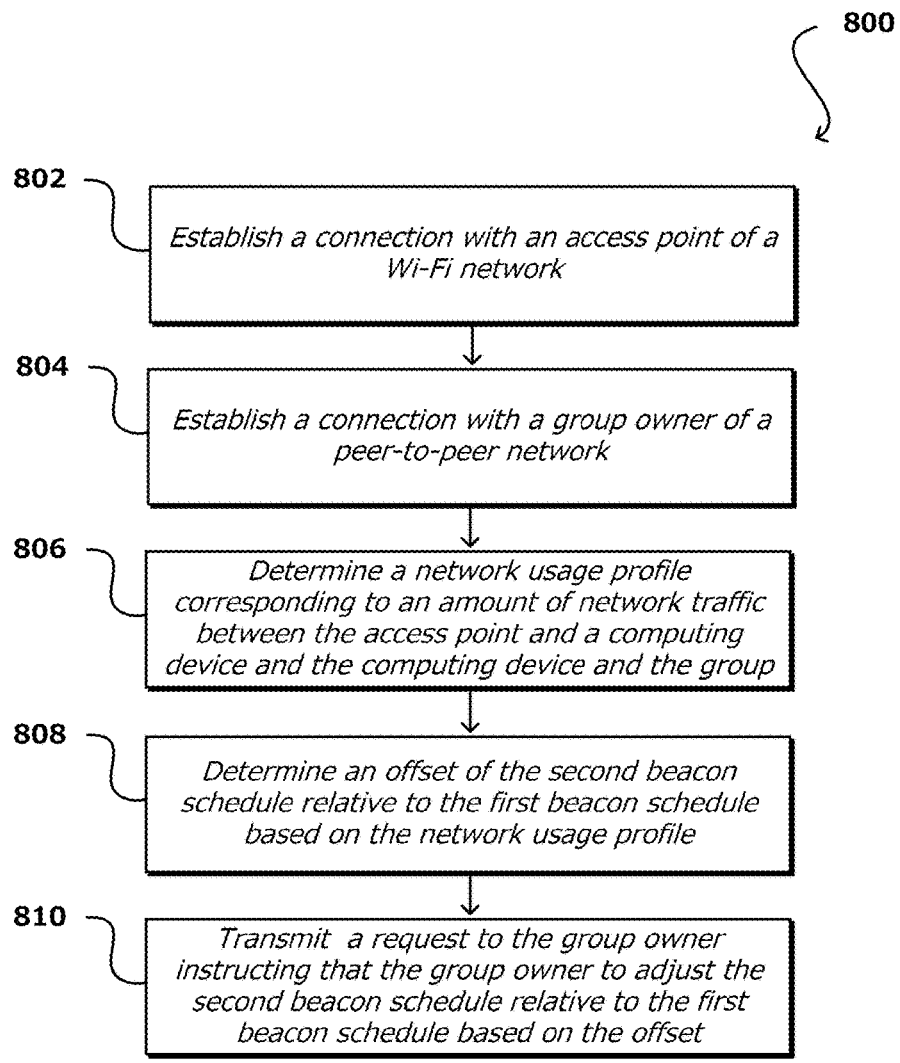
FIG. 8 illustrates an example process for synchronization a beacon schedule of a device based on a beacon schedule of a different device in accordance with various embodiments.

FIG. 8 illustrates an example process 800 for synchronizing a beacon schedule of a device based on a beacon schedule of a different device in accordance with various embodiments. It should be understood that there can be additional, fewer, or alternative steps performed in similar or alternative orders, or in parallel, within the scope of the various embodiments unless otherwise stated. The example method embodiment can start with establishing 802 a connection with an access point of a Wi-Fi network, the access point having a first beacon schedule and establishing 804 a connection with a group owner of a peer-to-peer network, the group owner having a second beacon schedule. As described, the group owner can be at least one of a television device operable to stream video to a computing device, an audio speaker, a network storage device, a mobile hot spot, among others and the computing device can be a mobile phone or other portable device, for example. In accordance with various embodiments, the peer-to-peer network can be a Wi-Fi Direct peer-to-peer (P2P) network wherein the Wi-Fi network can be a legacy Wi-Fi network.

A network usage profile can be determined 806. The network usage profile can correspond to an amount of network traffic between the access point and the computing device over the Wi-Fi network and the computing device and the group owner over the peer-to-peer network. For example, the network usage profile can be a log to a file or database that includes information about data sent and received between for the Wi-Fi network and the peer-to-peer network. The information can include, for example, an amount of data transferred over any of the networks or a combination of the networks, the time at which the data is transferred (i.e., sent or received), the data transfer speed, the type of data that is transferred (image, data, video, etc.), an amount of time that the client device speeds on each of the different networks, etc. In accordance with various embodiments, the usage profile can be stored on the client device or remote from the device. The information can include information provided by a service provider or other entity. The information can be sourced from other devices, such as other devices local to the Wi-Fi network or devices in communication with the service provider. For example, client devices can provide such usage information to the service provider and the service provider can in return provide averaged or otherwise aggregate information to the client devices in communication with the service provider.

In accordance with various determining a usage profile can include, for example, determining an application type of at least one running application on the computing device, where the application type can include at least one of an audio streaming application, a video streamlining application, a video game, a web browsing application, an e-mail application, a text messaging application, a social media application, among others. An estimated network usage between the Wi-Fi network and the peer-to-peer network can then be determined based at least in part on the type of the at least one running application. In certain embodiments, determining the usage profile can include retrieving previously determined information indicative of network usage based on the application type of the at least one running application.

An offset of the second beacon schedule relative to the first beacon schedule can be determined 808 based at least in part on the usage profile. For example, the usage profile can be based on, for example, a type of application running on the client device. In this situation, the type of application can indicate an amount of bandwidth required from the AP network and the GO network for data communication. For example, a video transmission application may require more bandwidth that a gamming application and as such, the offset would be set accordingly. In accordance with various embodiments, the usage profile can change when an application terminates or a different application starts. Accordingly, based at least in part on the client devices understanding of the network load for different networks, the client device can provide an adjusted offset to the GO so that the GO can adjust its beacon schedule to accommodate the amount of bandwidth required from the AP network and the GO network. As a result of receiving this information from the client, the GO will change its beacon schedule Thereafter, a request can be transmitted 810 to the group owner of the peer-to-peer network, the request including a name of the Wi-Fi network and the offset, the request instructing that the group owner to adjust the second beacon schedule relative to the first beacon schedule based at least in part on the offset. The name can include, for example, a SSID of the Wi-Fi network. Additional information can be provided as well, as may include an operating channel of the Wi-Fi network, a IBSS of the Wi-Fi network, for example. In certain embodiments, the request can instruct the group owner to adjust its beacon schedule based at least in part on a percentage of time that the computing device is to remain on the peer-to-peer network.

In accordance with various embodiments, the request can cause the group owner to identify the first beacon schedule, wherein upon identifying the first beacon schedule the group owner can identify a beacon interval of the first beacon schedule and adjust the second beacon schedule relative to the first beacon schedule based at least in part on the beacon interval and the offset. Advantageously, this synchronization of the beacon schedule between the client and the GO can enable improved throughput and latency of the client device when the client device is in concurrent mode (i.e., when the P2P client is connected to two networks such as a legacy Wi-Fi network with an AP and a P2P network with a GO). In particular, various embodiments described herein may enable higher throughput in both networks, reduced video streaming latency, lower packet loss rate, lower the probability of beacon-miss-induced disconnection, more predictable performance, and flexibility to adjust the ratio of time that the client device spends on two networks to accommodate the media data rate requirements. In some embodiments, the synchronization techniques described herein may be particularly useful for applications that utilize large amounts of packet communication between the GO and the client device, such as video streaming applications.

Figure 9:
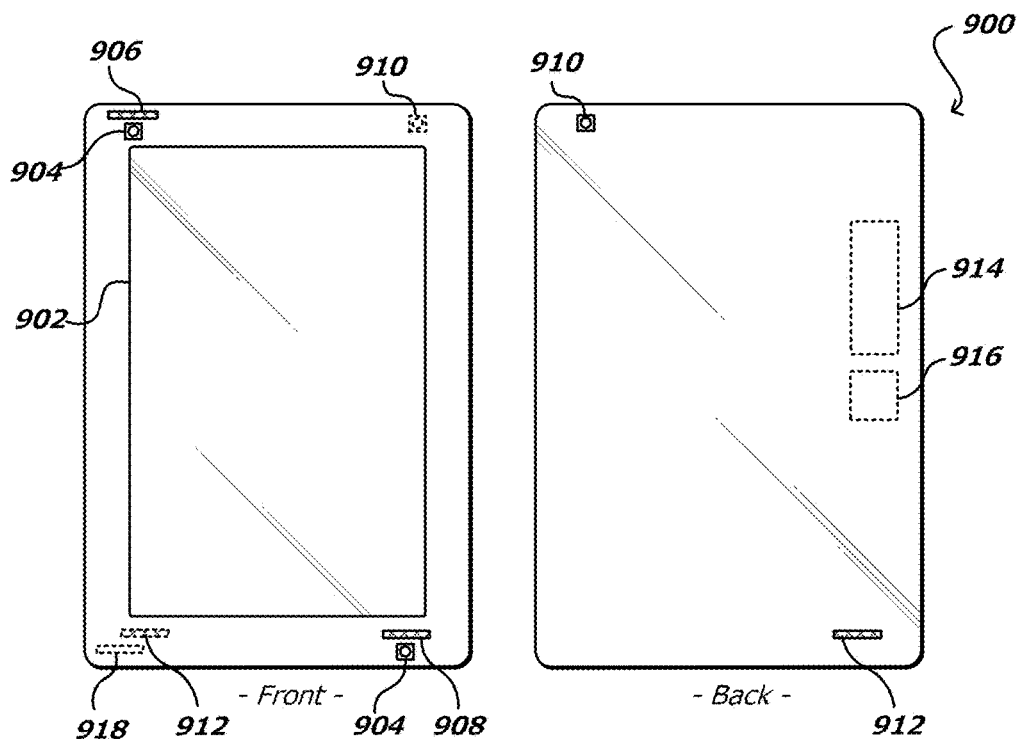
FIG. 9 illustrates front and back views of an example portable computing device that can be used in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled sensor (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 908 on the front side, one microphone 912 on the back, and one microphone 906 on or near a top or side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 914, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such component. Various other elements and/or combinations are possible as well within the scope of various embodiments.

Figure 10:
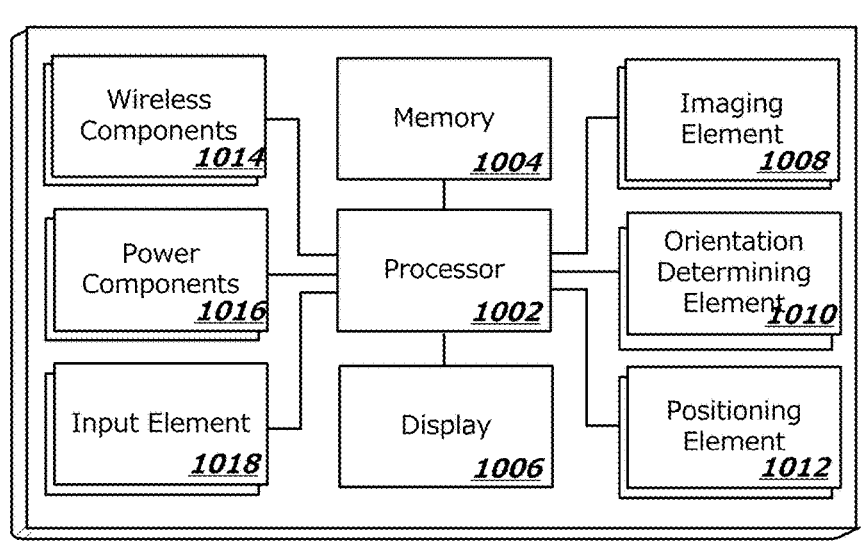
FIG. 10 illustrates an example set of basic components of a portable computing device, such as the device described with respect to FIG. 9.

FIG. 10 illustrates a set of basic components of an electronic computing device 1000 such as the device 900 described with respect to FIG. 9. In this example, the device includes at least one processing unit 1002 for executing instructions that can be stored in a memory component or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such component. Various other elements and/or combinations are possible as well within the scope of various embodiments.

In some embodiments the device can include at least one additional input component 1018 able to receive conventional input from a user. This conventional input can include, for example, a push button, touch pad, touch screen, wheel, joystick, keyboard, mouse, keypad, or any other such component or element whereby a user can input a command to the device. These I/O components could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 11:
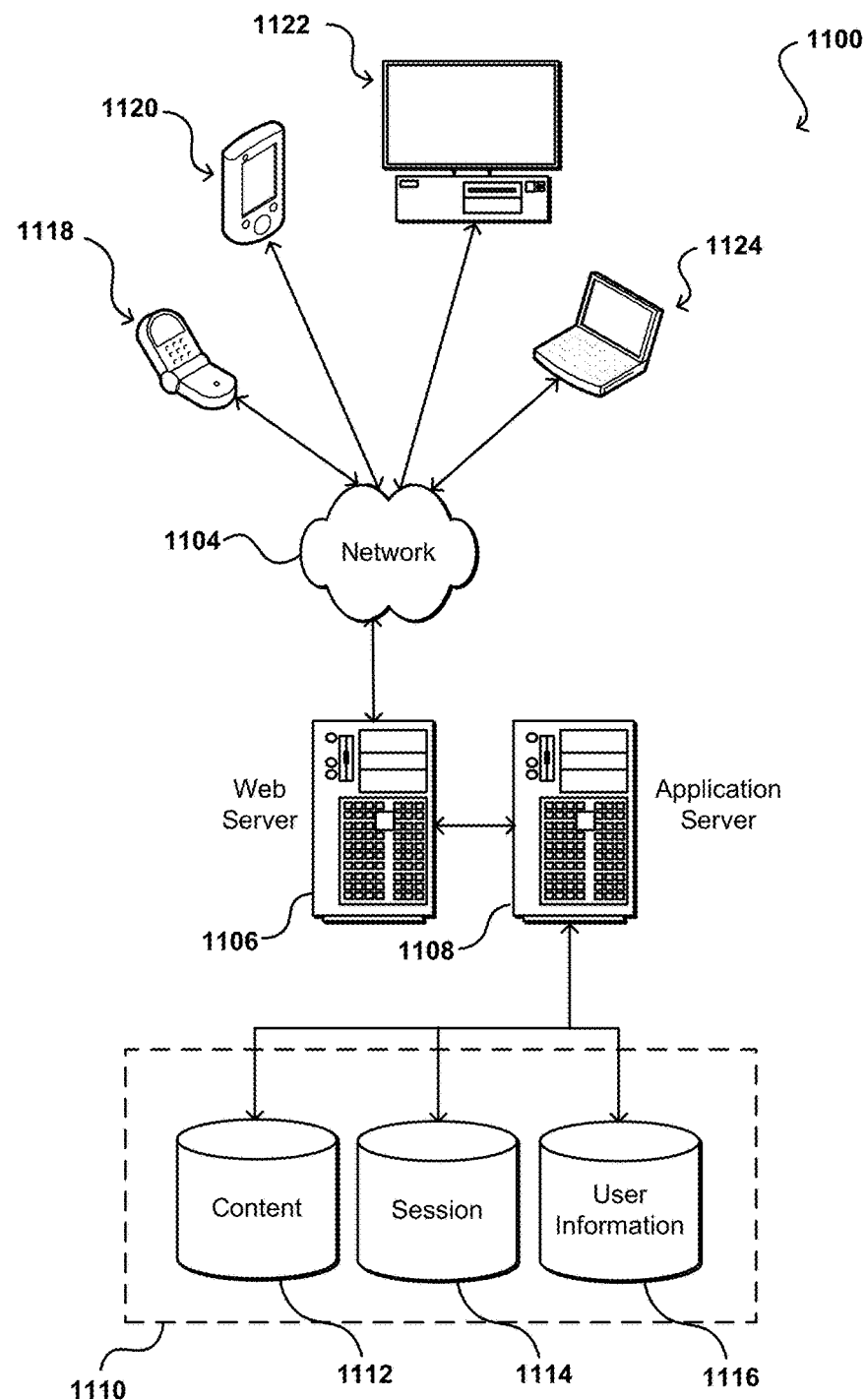
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes electronic client devices 1118, 1120, 1122, and 1124, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any components or combination of components capable of storing, accessing and retrieving data, which may include any combination and number of data servers, databases, data storage components and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client devices 1118, 1120, 1122, and 1124 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1118, 1120, 1122, and 1124. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network components may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing components such as network input/output components may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system component. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
  a wireless communication component;
  at least one processor; and
  memory including instructions that, when executed by the at least one processor, cause the computing device to:
    establish a connection with an access point of a wireless network, the access point having a first beacon schedule;
    establish a connection with a group owner of a peer-to-peer network, the group owner having a second beacon schedule;
    determine a usage profile corresponding to an amount of network traffic between the access point and the computing device over the wireless network and the computing device and the group owner over the peer-to-peer network;
    determine an offset of the second beacon schedule relative to the first beacon schedule based at least in part on the usage profile; and
    transmit a request to the group owner of the peer-to-peer network, the request including a name of the wireless network and the offset, the request causing the group owner to adjust the second beacon schedule based at least in part on the offset.

2. The computing device of claim 1, wherein the instructions, when executed to determine the offset, further cause the at least one processor to:
  determine an application type of at least one running application on the computing device, the application type including at least one of an audio streaming application or a video streaming application; and
  determine an estimated network usage between the wireless network and the peer-to-peer network based at least in part on the type of the at least one running application.

3. The computing device of claim 1, wherein the instructions, when executed, further cause the at least one processor to:
  cause the group owner to identify the first beacon schedule using at least the name of the wireless network, the group owner being configured to shift the second beacon schedule an amount equal to the offset.

4. The computing device of claim 1, wherein the peer-to-peer network is a Wi-Fi Direct peer-to-peer (P2P) network, and wherein the Wi-Fi network is a 802.11 wireless network.

5. A computer implemented method, comprising:
  establishing a connection with an access point of a first wireless network, the access point having a first beacon schedule;
  establishing a connection with a group owner of a second wireless network, the group owner having a second beacon schedule; and
  transmitting a message to the group owner of the second wireless network, wherein the message is configured to cause the group owner to adjust the second beacon schedule relative to the first beacon schedule, and the message specifies a time offset for the second beacon schedule relative to the first beacon schedule.

6. The computer implemented method of claim 5, wherein the group owner is at least one of a TV operable to stream video to a mobile phone, an audio speaker, a network storage device, or a mobile hot spot.

7. The computer implemented method of claim 5, further comprising:
  determining a network usage profile, the time offset being based at least in part the network usage profile.

8. The computer implemented method of claim 7, wherein determining the network usage profile includes:
  determining an application type of at least one running application on a computing device; and
  determining a first network usage over the first wireless network and a second network usage over the second wireless network based at least in part on the application type.

9. The computer implemented method of claim 7, wherein determining the network usage profile includes:
  retrieving previously stored information indicative of network usage.

10. The computer implemented method of claim 5, wherein the message causes the group owner to identify a beacon interval of the first beacon schedule and adjust the second beacon schedule based at least in part on the beacon interval and a time offset.

11. The computer implemented method of claim 5, further comprising:
providing identifying information of the access point to the group owner, the identifying information including at least one of a SSID of the first wireless network, an operating channel of the first wireless network, or an independent basic service set (IBSS) of the first wireless network to the group owner.

12. The computer implemented method of claim 5, wherein transmitting the message to the group owner further comprises:
specifying a percentage of time that a computing device is to remain on the second wireless network, the percentage of time being used to adjust the second beacon schedule relative to the first beacon schedule.

13. The computer implemented method of claim 7, wherein the network usage profile corresponds to an amount of network traffic between the access point and a computing device over the first wireless network and the computing device and the group owner over the second wireless network.

14. The computer implemented method of claim 6, wherein a beacon of the access point includes information corresponding to at least one of a beacon interval, a service set identification (SSID), or an independent basic service set (IBSS).

15. A non-transitory computer readable storage medium storing one or more sequences of instructions that, when executed by one or more processors, cause a computing system to:
establishing a connection with an access point of a first wireless network, the access point having a first beacon schedule;
establishing a connection with a group owner of a second wireless network, the group owner having a second beacon schedule; and
transmitting a message to the group owner of the second wireless network, wherein the message is configured to cause the group owner to adjust the second beacon schedule relative to the first beacon schedule, and the message specifies a time offset for the second beacon schedule relative to the first beacon schedule.

16. The non-transitory computer readable storage medium of claim 15, wherein the one or more sequences of instructions, when executed by the one or more processors, further cause the computing system to perform at least one of:
determine a network usage profile, the time offset being based at least in part the network usage profile.

17. The non-transitory computer readable storage medium of claim 16, wherein the one or more sequences of instructions, when executed by the one or more processors, further cause the computing system to:
determine an application type of at least one running application on a computing device; and
determine a first network usage over the first wireless network and a second network usage over the second wireless network based at least in part on the application type.

18. The non-transitory computer readable storage medium of claim 16, wherein the one or more sequences of instructions, when executed by the one or more processors to determine the network usage profile, further cause the computing system to:
retrieve previously stored information indicative of network usage based on an application type of at least one running application.

* * * * *